United States Patent
Samejima et al.

(10) Patent No.: US 8,976,545 B2
(45) Date of Patent: Mar. 10, 2015

(54) CURRENT RESONANCE POWER SUPPLY FOR DETECTING OVERCURRENT BASED ON AN OUTPUT FROM A CURRENT COMPENSATION UNIT

(75) Inventors: Keisuke Samejima, Suntou-gun (JP); Takayuki Fukutani, Meridian, ID (US)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 13/084,784

(22) Filed: Apr. 12, 2011

(65) Prior Publication Data
US 2011/0261592 A1    Oct. 27, 2011

(30) Foreign Application Priority Data

Apr. 21, 2010  (WO) .................. PCT/JP2010/057065

(51) Int. Cl.
| | | |
|---|---|---|
| *G05F 1/00* | (2006.01) | |
| *H02M 3/335* | (2006.01) | |
| *H02H 7/122* | (2006.01) | |
| *H02M 3/337* | (2006.01) | |
| *H02M 1/32* | (2007.01) | |
| *H02M 1/00* | (2006.01) | |

(52) U.S. Cl.
CPC .............. *H02M 3/3376* (2013.01); *H02M 1/32* (2013.01); *H02M 2001/0058* (2013.01); *Y02B 70/1491* (2013.01)
USPC ...................... 363/21.02; 323/284; 363/21.16; 363/56.03

(58) Field of Classification Search
USPC ...................... 363/21.02, 21.03, 21.16, 56.03; 323/284
See application file for complete search history.

(56) References Cited

U.S. PATENT DOCUMENTS

| | | | | |
|---|---|---|---|---|
| 5,333,104 A * | 7/1994 | Tamura et al. | ................... | 363/19 |
| 5,598,324 A * | 1/1997 | Imamura et al. | ........... | 363/21.02 |
| 6,940,189 B2 * | 9/2005 | Gizara | ......................... | 307/151 |
| 7,542,309 B2 * | 6/2009 | Leung | ....................... | 363/21.06 |
| 2001/0036090 A1 * | 11/2001 | Halberstadt | ............... | 363/21.02 |
| 2005/0213355 A1 * | 9/2005 | Koike | ........................ | 363/21.16 |
| 2007/0165426 A1 * | 7/2007 | Kyono | ....................... | 363/21.02 |
| 2008/0198638 A1 * | 8/2008 | Reinberger et al. | ............. | 363/74 |
| 2008/0266908 A1 * | 10/2008 | Halberstadt | ................ | 363/21.02 |
| 2009/0196074 A1 * | 8/2009 | Choi | ........................... | 363/21.02 |
| 2009/0303753 A1 * | 12/2009 | Fu et al. | .......................... | 363/20 |
| 2010/0054790 A1 * | 3/2010 | Inukai | ............................ | 399/88 |

FOREIGN PATENT DOCUMENTS

| | | |
|---|---|---|
| CN | 1806380 A | 7/2006 |
| CN | 101005239 A | 7/2007 |
| CN | 101304211 A | 11/2008 |
| JP | 4-97480 U | 8/1992 |
| JP | 6-22467 A | 1/1994 |
| JP | 7-274499 A | 10/1995 |
| JP | 8-111977 A | 4/1996 |

(Continued)

*Primary Examiner* — Adolf Berhane
*Assistant Examiner* — Gary Nash
(74) *Attorney, Agent, or Firm* — Canon USA, Inc. IP Division (57) ABSTRACT

A current resonance power supply includes a current detecting unit detecting a current flowing through a primary side of a transformer and a current compensating unit compensating the current detected by the current detecting unit in accordance with a variation in voltage input into the primary side of the transformer. The current resonance power supply detects overcurrent on the basis of an output from the current compensating unit.

4 Claims, 8 Drawing Sheets

(56) References Cited

FOREIGN PATENT DOCUMENTS

| | | |
|---|---|---|
| JP | H08-111977 A | 4/1996 |
| JP | 3013697 B2 | 2/2000 |
| JP | 03013697 B2 | 2/2000 |
| JP | 2002-142456 A | 5/2002 |
| JP | 2007-195287 A | 8/2007 |
| JP | 2009-261100 A | 11/2009 |

* cited by examiner

| WAVEFORM | INPUT AC VOLTAGE | (AMOUNT OF) VOLTAGE COMPENSATION |
|---|---|---|
| 401 | HIGH | COMPENSATED LARGER AMOUNT OF COMPENSATION |
| 402 | HIGH | NOT COMPENSATED |
| 403 | LOW | COMPENSATED SMALLER AMOUNT OF COMPENSATION |
| 404 | LOW | NOT COMPENSATED |

CURRENT RESONANCE POWER SUPPLY FOR DETECTING OVERCURRENT BASED ON AN OUTPUT FROM A CURRENT COMPENSATION UNIT

TECHNICAL FIELD

The present invention relates to a current-resonance-type power supply apparatus.

BACKGROUND ART

Current-resonance-type switching power supplies are known as examples of power supply apparatuses that switch voltage resulting from rectification and smoothing of alternating current voltage input from commercial power supplies (such voltage is hereinafter referred to as input AC voltage) with switching elements to output stable direct current (DC) voltage via insulation transformers.

Such a current-resonance-type switching power supply generally includes a circuit that detects overcurrent at a primary side of the transformer. The overcurrent is detected in order to protect elements including a field effect transistor (FET) serving as the switching element, the transformer, and a current resonance capacitor from an overcurrent state. The switching power supply operates so as to keep the output at a secondary side of the transformer at a constant level with lower AC voltage input from the commercial power supply. As a result, the turning-on time of the FET is increased and the current at the primary side of the transformer is increased to cause the primary side to be in the overcurrent state. When the primary side of the transformer is in the overcurrent state, the current exceeding the rating (breakdown voltage) of the elements including the FET at the primary side possibly flows to damage the elements. Accordingly, it is necessary to monitor and detect the overcurrent state to stop the switching element in order to protect the elements at the primary side.

As a method of detecting the overcurrent at the primary side, PTL 1 proposes a method in which a current detection capacitor connected in parallel to a current resonance capacitor is provided and the current flowing through the current detection capacitor is converted into voltage to detect the overcurrent.

CITATION LIST

Patent Literature

PTL 1 Japanese Patent Application No. 3013697

However, since the current at the primary side of the transformer is detected in the method of detecting the overcurrent described in PTL 1, the detected current is varied due to the overcurrent if the input AC voltage is varied. For example, if the input AC voltage is decreased, the detected current value is increased. In other words, the current flowing through the current detection capacitor is increased. A structure in which a current detection resistor is provided to detect the overcurrent may be adopted as another method. However, the current flowing through the current detection resistor is also increased by this method.

Specifically, with the detection method using the current detection capacitor described in PTL 1 or with the detection method using the current detection resistor, it is erroneously detected that the overcurrent occurs despite of the fact that the overcurrent does not occur if the input AC voltage is varied. This phenomenon results from control of the switching operation so as to keep the power at the primary side of the transformer at a constant level in order to output a constant power against a load at the secondary side of the transformer.

In order to resolve the above problems, an object of the present invention is to correctly detect the overcurrent even if an input AC voltage is varied.

SUMMARY OF INVENTION

According to an embodiment of the present invention, in a current resonance power supply including a transformer, two switching elements that are arranged in series and are connected to one end of a primary winding of the transformer, and a resonance capacitor connected to other end of the primary winding, the two switching elements are alternately operated to resonate the primary winding with the resonance capacitor in order to induce an alternating current voltage at a secondary winding of the transformer. The current resonance power supply includes a current detecting unit that is connected between the other end of the primary winding and the resonance capacitor and that detects a current flowing through a primary side of the transformer; and a current compensating unit that is connected between the one end of the primary winding and the two switching elements and that compensates the detected current in accordance with a variation in the operation of the two switching elements, caused by a variation in voltage input into the primary side of the transformer. The current resonance power supply is controlled based on an output from the current compensating unit.

Further features of the present invention will become apparent from the following description of exemplary embodiments with reference to the attached drawings.

DESCRIPTION OF EMBODIMENTS

Specific structures of the present invention to resolve the above problems will herein be described on the basis of embodiments described below. The embodiments described below are only examples and it is not intended that the technical scope of the present invention is limited only to the embodiments.

(Operation of Current-Resonance-Type Power Supply Apparatus)

Figure 7:
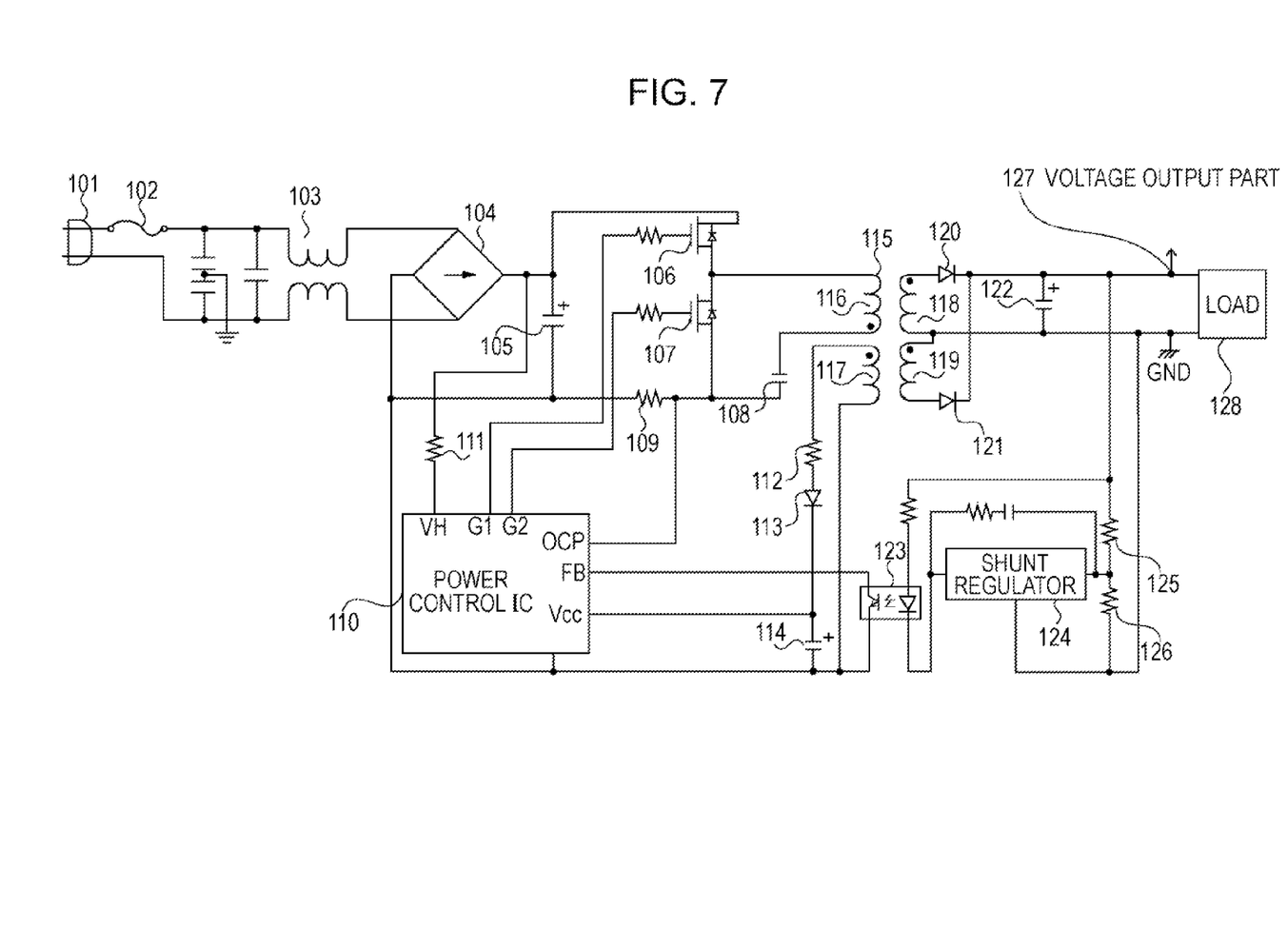
FIG. 7 is an exemplary circuit diagram of a current resonance power supply apparatus in related art.

A basic operation of a current-resonance-type power supply apparatus (hereinafter referred to as a current resonance power supply apparatus) will now be described with reference to a circuit diagram shown in FIG. 7. Referring to FIG. 7, reference numeral 101 denotes an inlet, reference numeral 102 denotes a fuse, reference numeral 103 denotes a common mode coil, reference numeral 104 denotes a rectifying diode bridge, reference numeral 105 denotes a primary smoothing capacitor, and reference numerals 106 and 107 denote FETs serving as switching elements. Reference numeral 108 denotes a current resonance capacitor, reference numeral 109 denotes a current detection resistor, reference numeral 110 denotes a power control integrated circuit (IC) controlling the operation of a power supply, reference numeral 111 denotes a starting resistor, reference numeral 112 denotes a resistor, reference numeral 113 denotes a diode, reference numeral 114 denotes a capacitor, reference numeral 115 denotes a transformer, reference numeral 116 denotes a primary winding of the transformer 115, reference numeral 117 denotes an auxiliary winding of the transformer 115, reference numerals 118 and 119 denote secondary windings of the transformer 115, reference numerals 120 and 121 denote rectifying diodes, reference numeral 122 denotes a smoothing capacitor, reference numeral 123 denotes a photocoupler, reference numeral 124 denotes a shunt regulator, reference numerals 125 and 126 denote regulation resistors, reference numeral 127 denotes a voltage output part, and reference numeral 128 denotes a load connected to the power supply apparatus.

The power control IC 110 controls on and off periods of a control signal applied to the gate terminal of each of the FET 106 and the FET 107 so that the direct current voltage output from the voltage output part 127 is kept at a constant level. A voltage resulting from rectification and smoothing by a rectification-smoothing circuit including the auxiliary winding 117 of the transformer 115, the resistor 112, the diode 113, and the capacitor 114 is supplied as power for driving the power control IC 110.

In this structure, upon supply of power to the power control IC 110 through the starting resistor 111, the control signal is supplied from the power control IC 110 to the gate terminal of each of the FETs 106 and 107 to cause the FETs 106 and 107 to be alternately turned on and off. Then, the voltage of the primary smoothing capacitor 105 is applied to the primary winding 116 of the transformer 115 to cause an alternating current to flow through the primary winding 116. The flow of the alternating current through the primary winding will now be described in association with on and off states of the FET 106 and the FET 107.

(State 1) The FET 106 is in the on state and the FET 107 is in the off state

The current flows on a path through the primary smoothing capacitor 105→the FET 106→the primary winding 116 of the transformer 115→the current resonance capacitor 108→the current detection resistor 109→the primary smoothing capacitor 103.

(State 2) The FET 106 is changed from the on state to the off state and the FET 107 is in the off state Then, since the power supply apparatus operates so as to maintain the current flowing through the primary winding 116 of the transformer 115 even if the FET 106 is changed from the on state to the off state, the current flows on a path through the primary winding 116 of the transformer 115→the current resonance capacitor 108→a parasitic diode included in the FET 107.

(State 3) The FET 107 is in the off state and the FET 107 is changed from the off state to the on state Then, even if the FET 107 is set to the on state in State 2, the current continuously flows on the path through the primary winding 116 of the transformer 115→the current resonance capacitor 108→the FET 107. However, the flow of the current is gradually changed to a path through the current resonance capacitor 108→the primary winding 116 of the transformer 115→the FET 107 due to the resonance effect of the leakage inductance of the transformer 115 and the current resonance capacitor 108.

(State 4) the FET 106 is in the off state and the FET 107 is in the off state

Then, since the power supply apparatus operates so as to maintain the current flowing through the primary winding 116 of the transformer 115 even if the FET 107 is set to the off state in State 3, the current flows on a path through the primary winding 116 of the transformer 115→a parasitic diode included in the FET 106→the primary smoothing capacitor 105.

(State 5) the FET 106 is changed from off state to the on state and the FET 107 is in the off state Then, even if the FET 106 is set to the on state in State 4, the current continuously flows on the path through the primary winding 116 of the transformer 115→the FET 106→the primary smoothing capacitor 105. However, the flow of the current is gradually changed to the path through the primary smoothing capacitor 105→the FET 106→the primary winding 116 of the transformer 115→the current resonance capacitor 108→the current detection resistor 109→the primary smoothing capacitor 105 due to the resonance effect of the leakage inductance of the transformer 115 and the current resonance capacitor 108.

The alternating currents in the forward direction and the opposite direction alternately flow through the primary winding 116 of the transformer 115 in the above manner and, thus, an alternating current voltage is induced in the secondary windings 118 and 119 of the transformer 115. The induced voltage is rectified and smoothed by a rectification-smoothing circuit including the two rectifying diodes 120 and 121 and the smoothing capacitor 122 to output a direct current voltage from the voltage output part 127.

In addition, the voltage from the voltage output part 127 is divided by the regulation resistors 125 and 126 and the divided voltage is supplied to the shunt regulator 124. A feedback signal corresponding to the voltage input into the shunt regulator 124 is generated and is fed back to an FB terminal of the power control IC 110 through the photocoupler 123. The power control IC 110 controls the timing of the switching operation of the FETs 106 and 107 on the basis of the feedback signal and a desired stable direct current voltage is output from the voltage output part 127.

At this time, an alternating current voltage is induced also at the auxiliary winding 117 of the transformer 115 and the induced voltage is rectified and smoothed by the resistor 112, the diode 113, and the capacitor 114 to be supplied to the power control IC 110 as a power supply voltage for driving the power control IC 110. The power is not supplied from the starting resistor 111 when the power is supplied from the auxiliary winding 117 of the transformer 115 as the driving power of the power control IC 110 in the above manner.

Figure 8:
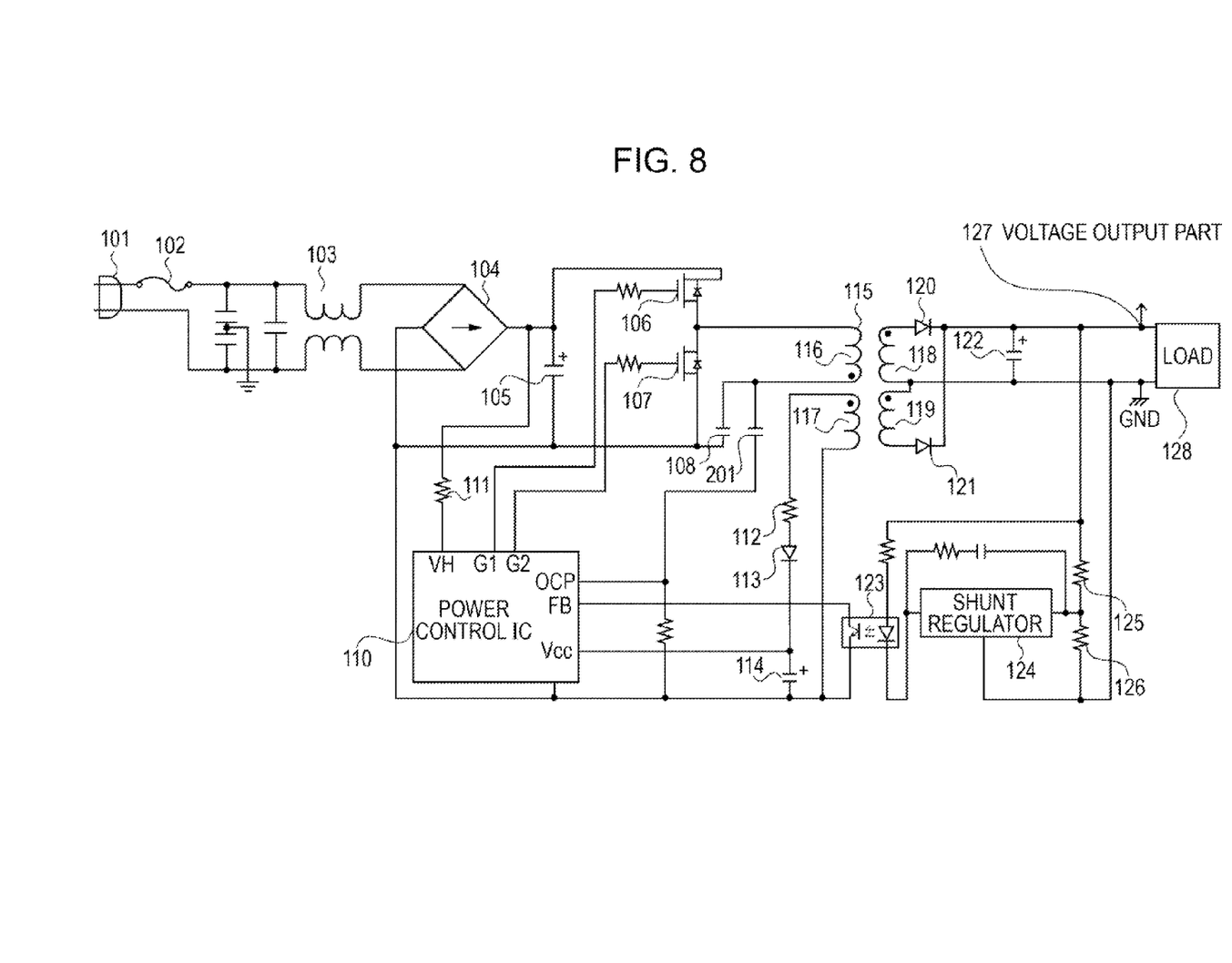
FIG. 8 is an exemplary circuit diagram of another current resonance power supply apparatus in the related art.

The current resonance power supply in FIG. 7 has the structure in which the current detection resistor 109 described above is provided to detect the overcurrent. A structure described in PTL 1, in which a current detection capacitor 201 is provided to detect the overcurrent, is shown in FIG. 8.

Structures and operations of circuits for detecting the overcurrent according to embodiments of the present invention will now be described in detail on the basis of the operation of the current resonance power supply described above.

First Embodiment

Figure 1:
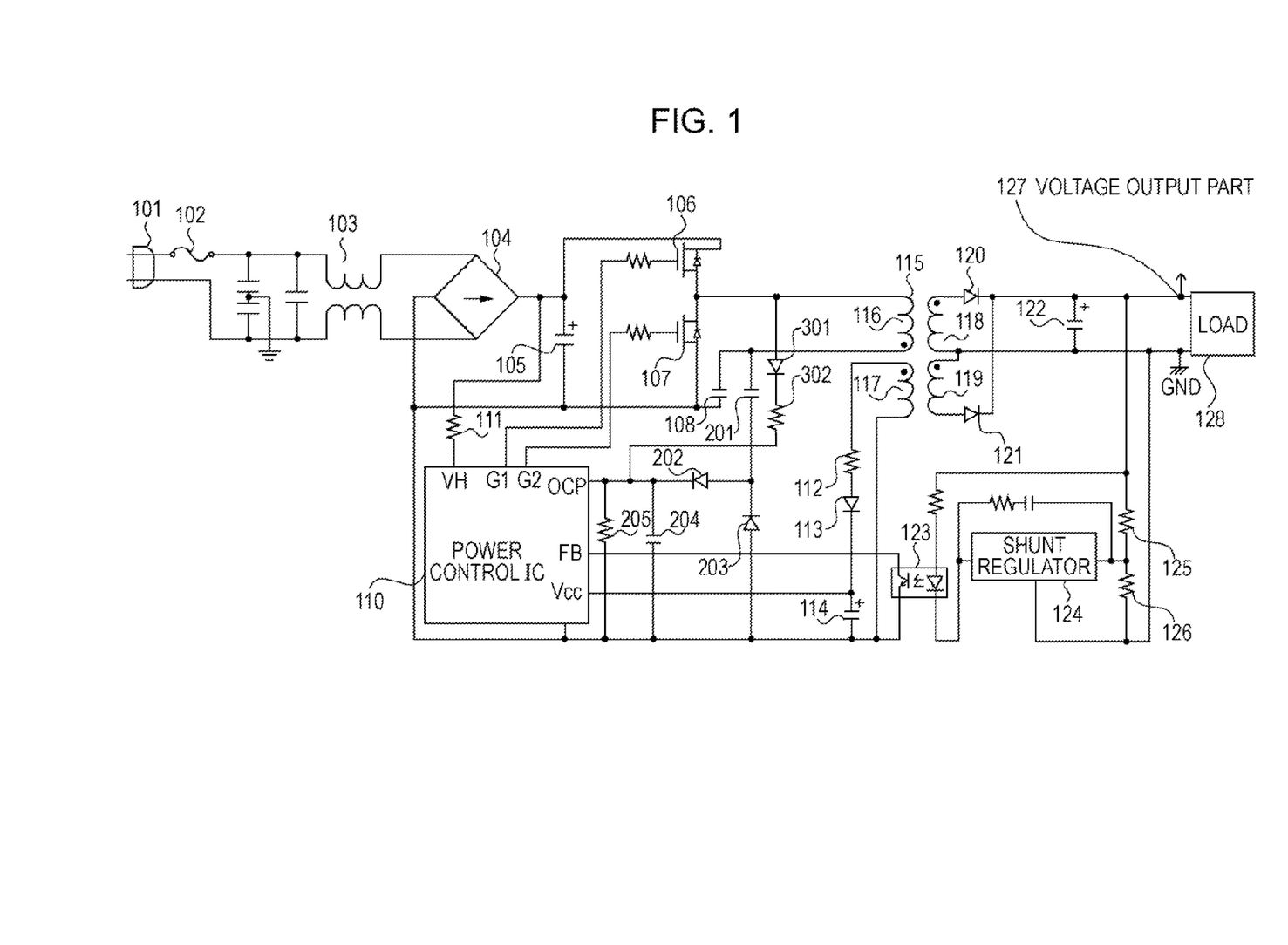
FIG. 1 is a circuit diagram of a current resonance power supply apparatus according to a first embodiment of the present invention.

FIG. 1 is a circuit diagram of a current-resonance-type power supply apparatus (hereinafter referred to as a current resonance power supply apparatus) according to a first embodiment of the present invention. The current resonance power supply apparatus in FIG. 1 differs from the structure in FIG. 8 described above in that an overcurrent detection circuit is composed of two circuits: a current detection circuit and an input AC voltage compensation circuit described below. The current resonance power supply apparatus in the present embodiment alternately operates the two FETs connected at the primary side of the transformer to resonate the primary winding of the transformer and the resonance capacitor, thereby inducing an alternating current voltage at the primary side of the transformer, as in the structure in FIG. 8. A description of the structure common to that in FIG. 8 is omitted herein.

The current detection circuit includes the capacitor 201 in FIG. 8, diodes 202 and 203, and a capacitor 204 and functions as a current detecting unit at the primary side of the transformer. The capacitor 201 is connected to one end (the side to which the resonance capacitor 108 is connected) of the primary winding at the primary side of the transformer 115 and the diodes 202 and 203 and the capacitor 204 are further connected at this side. A value that is detected is input into an overcurrent protection (OCP) terminal of the power control IC. The input AC voltage compensation circuit includes a diode 301, resistors 302 and 205, and the capacitor 204 (shared with the current detection circuit) and functions as a current compensating unit of the current detected by the current detection circuit. The diode 301 and the resistor 302 are connected to the other end (the side to which the FETs 106 and 107 that are arranged in series are connected) of the primary winding at the primary side of the transformer 115, and the current detection circuit is connected between the diode 301 and the resistor 302 and the OCP terminal of the power control IC. The power control IC functions as a control unit controlling the on-off operation of the FETs 106 and 107, as in the structure in FIG. 8.

A case in which the overcurrent detection circuit operates only with the current detection circuit and the input AC voltage compensation circuit is ignored will now be considered. In this case, if the current through the load 128 and the voltage of the voltage output part 127 meet predetermined conditions, the voltage at the OCP terminal of the power control IC 110 is inversely proportional to the input AC voltage. This is because the power control IC 110 controls the switching frequency of the FETs 106 and 107 so as to keep the power at the primary side at a constant level when the conversion efficiency at the primary side is equal to that at the secondary side and a constant power is output at the secondary side. Specifically, the current flowing through the primary side, mainly, the current flowing through the FETs 106 and 107, the primary winding 116 of the transformer 115, and the capacitor 201 is decreased with the increasing input AC voltage and, thus, the voltage at the OCP terminal of the power control IC 110 is decreased. In contrast, the current flowing through the primary side is increased with the decreasing input AC voltage and, thus, the voltage at the OCP terminal of the power control IC 110 is increased. The power at the primary side is controlled in the above manner.

A case in which the overcurrent detection circuit operates only with the input AC compensation circuit and the current detection circuit is ignored will now be considered. In this case, the voltage at the OCP terminal of the power control IC 110 is proportional to the input AC voltage. This is because the voltage at the OCP terminal of the power control IC depends on the input AC voltage.

Figure 2:
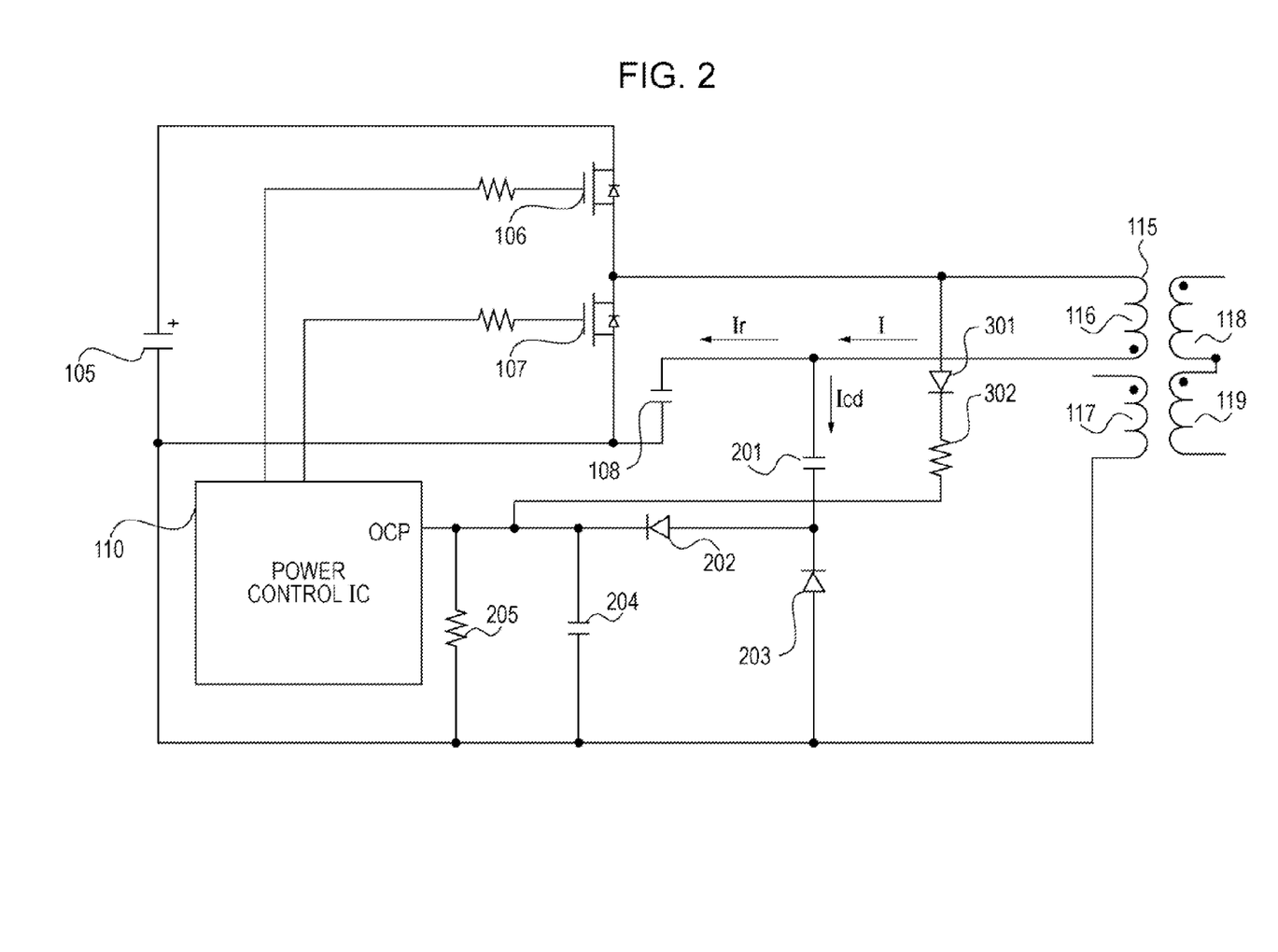
FIG. 2 shows a characteristic part in the current resonance power supply apparatus according to the first embodiment.

FIG. 2 shows a current resonance converter part in the current resonance power supply apparatus in FIG. 1. Referring to FIG. 2, I denotes a current that flows out from the primary winding 116 of the transformer 115 through the FET 106, Ir denotes a current that flows out from the primary winding 116 of the transformer 115 and flows into the resonance capacitor 108, and Icd denotes a current that flows out from the primary winding 116 of the transformer 115 and flows into the capacitor 201. Icd is expressed by Expression 1:

$$Icd = (Ccd/(Ccd+Cr)) \times I \qquad \text{Expression 1}$$

Cr: Electrostatic capacitance of current resonance capacitor 108
Ccd: Electrostatic capacitance of capacitor 201

In the case in which the input AC voltage compensation circuit is ignored and the overcurrent detection circuit operates only with the current detection circuit, a voltage Vcd occurring at both ends of the resistor 205 is expressed by Expression 2 by using the current Icd:

$$Vcd = Icd \times Rcd \qquad \text{Expression 2}$$

Rcd: Resistance of resistor 205
(However, in a case in which the resistance components downstream of the OCP terminal are ignored)

A peak value Ipeak of the current I can be expressed by Expression 3, Expression 4, and Expression 5 indicated below:

$$Ipeak = Vdch/X \qquad \text{Expression 3}$$

Vdch: Voltage at +terminal of primary smoothing capacitor 105
X: Combined reactance of leakage inductance of transformer 115 and current resonance capacitor 108

$$X = 2 \times \Pi \times f \times Lr - 1/(2 \times \Pi \times f \times Cr) \qquad \text{Expression 4}$$

f: Switching frequency of switching FETs 106 and 107 controlled by power control IC 110
Lr: Leakage inductance of transformer 115
Cr: Capacitance of current resonance capacitor 108
Accordingly, Expression 5 is given:

$$Ipeak = Vdch/(2 \times \Pi \times f \times Lr - 1/(2 \times \Pi \times f \times Cr)) \qquad \text{Expression 5}$$

The power control IC 110 controls the switching frequency of the FETs 106 and 107 so that Ipeak ∝ 1/Vdch, that is, Ipeak ∝ 1/the input AC voltage. This is because the power control IC 110 controls the switching frequency of the FETs 106 and 107 so as to keep the power at the primary side at a constant level when a constant power is output at the secondary side, as described above. For example, when the input AC voltage is high, the switching frequency of the FETs 106 and 107 is controlled to decrease the current flowing through the primary side. In contrast, when the input AC voltage is low, the switching frequency of the FETs 106 and 107 is controlled to increase the current flowing through the primary side. Consequently, since a relationship I ∝ 1/the input AC voltage is also established, relationships Icd ∝ 1/the input AC voltage and Vcd ∝ 1/the input AC voltage are established according to Expression 1.

Next, in the case in which the current detection circuit is ignored and the overcurrent detection circuit operates only with the input AC compensation circuit also in FIG. 2, a voltage Vacr occurring at both ends of the resistor 205 is expressed by Expression 6:

$$Vacr=((R205/(R205+R302))\times Vdch\times \text{On\_DUTY}/(\text{On\_DUTY}+R/R205\times \text{Off\_DUTY}) \quad \text{Expression 6}$$

R205: Resistance of resistor 205
R302: Resistance of resistor 302
R: Combined resistance of resistor 205 and resistor 302
Vdch: Voltage at +terminal of primary smoothing capacitor 105
On_DUTY: Duty ratio when switching FET 107 is in on state
Off_DUTY: Duty ratio when switching FET 107 is in off state (however, forward voltage of diode 301 is ignored)

Expression 6 will now be described. If the circuit does not include the diode 301 and includes only the resistor 302, Vacr is given by Expression 7:

$$Vacr=((R205/(R205+R302))\times Vdch\times \text{On\_DUTY}/(\text{On\_DUTY}+\text{Off\_DUTY}) \quad \text{Expression 7}$$

However, with the diode 301, the voltage discharged from the capacitor 201 is decreased by the amount corresponding to a ratio: R/R205 (combined resistance of the resistor 205 and the resistor 302/resistance of the resistor 205) when the switching FET 107 is in the off state. Accordingly, Off_DUTY in Expression 7 is multiplied by R/R205 to give Expression 6. Since Vdch∝the input AC voltage, a relationship Vacr∝the input AC voltage is established.

As described above, a voltage Vocp applied to the OCP terminal of the power control IC while the current resonance power supply apparatus is operating is expressed by Expression 8:

$$Vocp \approx Vcd+Vacr \quad \text{Expression 8}$$

This voltage indicates that Vcd is inversely proportional to the input AC voltage and Vacr is proportional to the input AC voltage. Accordingly, the constants of the capacitors 201 and 204 and the resistors 302 and 205 are adjusted to adjust the voltages Vcd and Vacr so that the voltage Vocp is at a constant level regardless of a variation in the input AC voltage when the current flowing through the load 128 is at a constant level. This allows Vocp to be correctly detected regardless of the variation in the input AC voltage, thus preventing the overcurrent detection from being incorrectly performed. As a result, it is possible to perform an overcurrent protection operation. The overcurrent protection operation is an operation to stop the operation of the FETs 106 and 107 if the value of a current flowing into the OCP terminal exceeds a predetermined threshold value (a current value for circuit protection).

Figure 3:
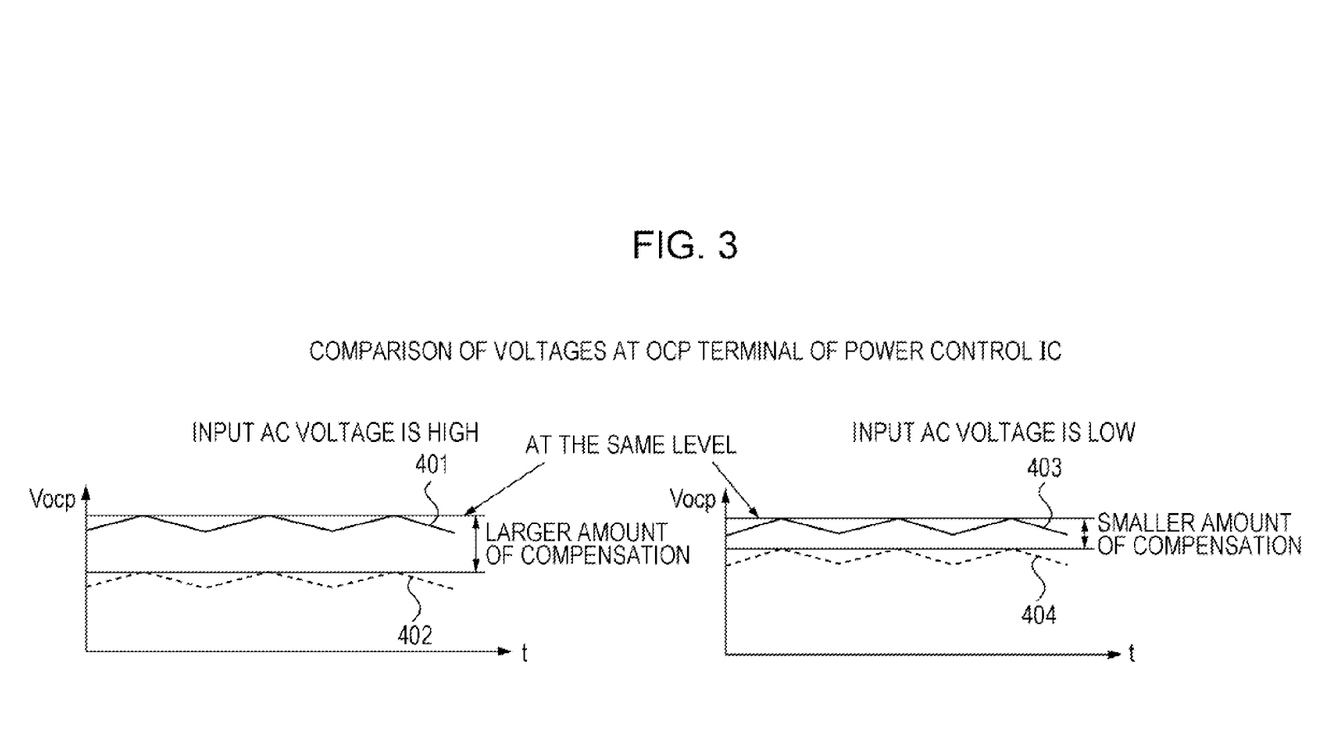
FIG. 3 shows voltage waveforms when the circuit of the first embodiment operates.

This operation will now be described with reference to a waveform diagram in FIG. 3. FIG. 3 indicates the voltage Vocp at the OCP terminal of the power control IC when the input AC voltage compensation circuit is provided at different input AC voltages and when the input AC voltage compensation circuit is not provided at different input AC voltages. It is assumed in FIG. 3 that the current flowing into the load 128 is at a constant level.

Waveform 401
The waveform of Vocp when the input AC voltage is high and the input AC voltage compensation circuit is provided.
Waveform 402
The waveform of Vocp when the input AC voltage is high and the input AC voltage compensation circuit is not provided.
Waveform 403
The waveform of Vocp when the input AC voltage is low and the input AC voltage compensation circuit is provided.
Waveform 404
The waveform of Vocp when the input AC voltage is low and the input AC voltage compensation circuit is not provided.

Figure 4:
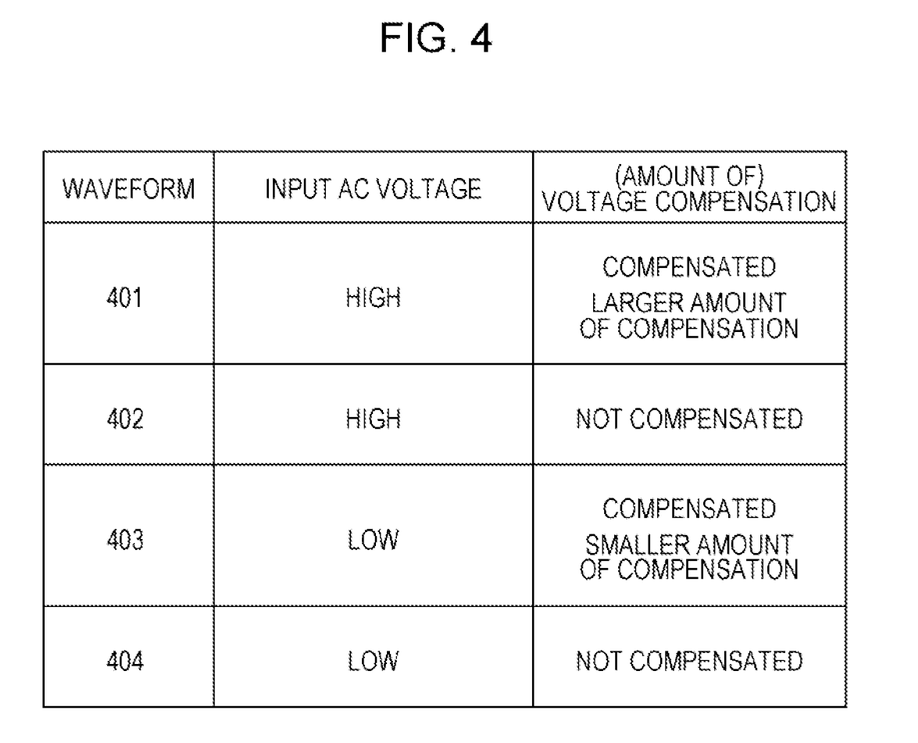
FIG. 4 is a table showing the relationship between the voltage waveforms in FIG. 3.

The relationship between the waveforms 401 to 404 is shown in a table in FIG. 4.

The waveform 401 results from addition of an input AC compensation voltage to the waveform 402. The amount of compensation in this case is large because the input AC voltage is high. In contrast, the waveform 403 results from addition of the input AC compensation voltage to the waveform 404. The amount of compensation in this case is small because the input AC voltage is low. The value of the voltage of the waveform 401 to which the input AC compensation voltage is added is the same as that of the waveform 403 to which the input AC compensation voltage is added. As described above, it is possible to perform the overcurrent protection operation while keeping the current flowing into the load 128 at a constant level by keeping Vocp at a constant level regardless of the input AC voltage.

The compensation in the input AC voltage compensation circuit is based on the voltage at the +terminal of the primary smoothing capacitor 105 in the present embodiment, as shown in FIG. 1. This voltage does not appear before the FET 106 is in the on state. Accordingly, the present embodiment is also characterized in that the input AC voltage compensation circuit consumes the power only after the current resonance power supply apparatus starts to operate.

Second Embodiment

Figure 5A:
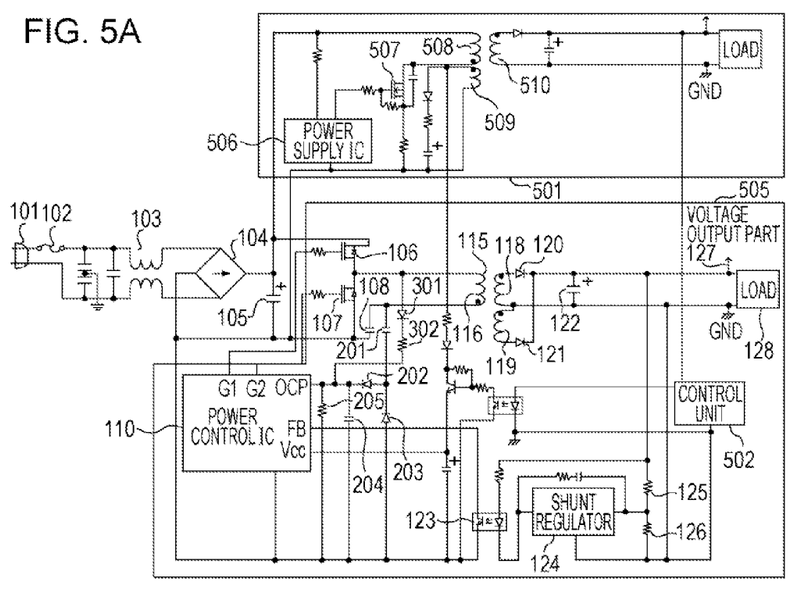
FIG. 5A is a circuit diagram of a current resonance power supply apparatus according to a second embodiment of the present invention.
Figure 5B:
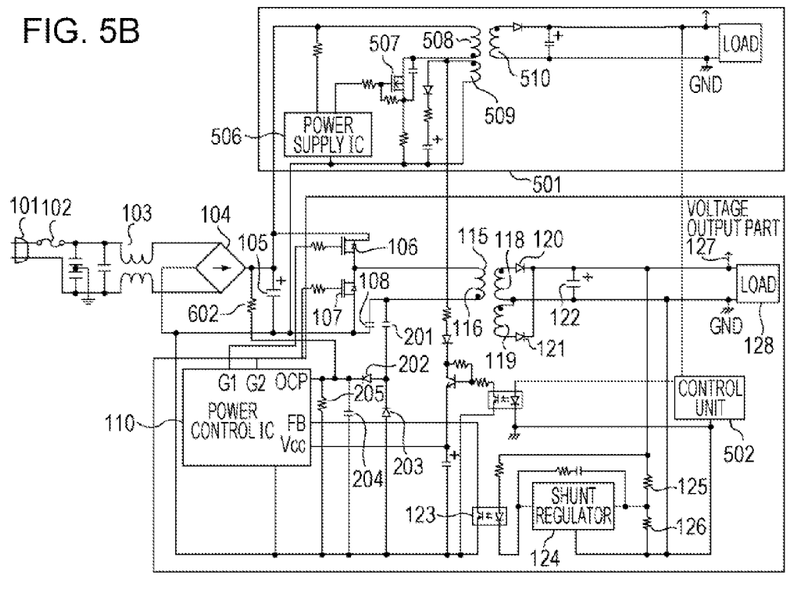
FIG. 5B is a comparative circuit diagram.

FIG. 5 includes a circuit diagram of a current resonance power supply apparatus according to a second embodiment of the present invention. In the second embodiment, power saving is realized while the function of compensating the AC voltage, described above in the first embodiment, is given to the overcurrent detection circuit. A description of the structure and operation of the current resonance power supply apparatus common to those in the first embodiment is omitted herein.

Referring to FIG. 5A, reference numeral 501 denotes a constant power supply unit. The main part of the constant power supply unit 501 is shown in FIG. 5A. The constant power supply unit means a power supply that is constantly in the on state. The constant power supply unit continues to operate without stop while the input AC voltage is being supplied. Reference numeral 506 denotes a power supply IC controlling the operation of the constant power supply unit and reference numeral 507 denotes a switching element, the switching operation of which is controlled by the power supply IC 506. Reference numeral 508 denotes a primary winding of a transformer, reference numeral 509 denotes an auxiliary winding thereof, and reference numeral 510 denotes a secondary winding thereof. In the present embodiment, power is supplied from the auxiliary winding 509 of the transformer in the constant power supply unit 501 to a Vcc terminal, which is a power supply terminal of the power control IC 110 in a current resonance power supply 505 serving as a non-constant power supply unit. The non-constant power supply unit means a power supply that can be switched from the on state to the off state. The current resonance power supply 505 has a structure in which a control unit 502 controls the power supply to the Vcc terminal of the power control IC 110 to turn on or off the operation of the current resonance power supply 505, which is a non-constant power supply unit. In other words, the control unit 502 functions as a voltage supply control unit to the power control IC 110 of the current resonance power supply 505.

Specifically, since the power supply to the control unit 502 is controlled by the constant power supply unit 501, only the constant power supply unit 501 may be operated and the output operation of the current resonance power supply 505 may be stopped when the operation of the current resonance power supply 505 is not necessary. This allows a power saving operation to be realized. Such a state (mode) in which the power saving operation is performed is generally called a sleep mode. Since the power consumption can be suppressed as much as possible in the sleep mode in the power supply apparatus shown in FIG. 5A, it is possible to further improve the power saving.

The current resonance power supply 505 in the present embodiment includes an overcurrent detection circuit including a current detection circuit and an input AC voltage compensation circuit, as in the first embodiment. Since the current resonance power supply 505 is stopped in the sleep mode, the FET 106 is prevented from being turned on. Accordingly, the power consumption by the input AC voltage compensation circuit is eliminated. Specifically, with the input AC voltage compensation circuit having the structure shown in FIG. 5, it is possible to perform the AC voltage compensation to the overcurrent detection circuit when the constant power supply unit 501 is operating, without an increase in the power consumption in the sleep mode.

Structures to compensate the input AC voltage can be considered, in addition to the input AC voltage compensation circuit having the structure shown in FIG. 5A. For example, a structure shown in FIG. 5B is an exemplary structure to compensate the input AC voltage. However, the structure in FIG. 5B has a problem in that the power consumption is increased because of the function of compensating the input AC voltage. Specifically, the structure in FIG. 5B includes an input AC voltage compensation circuit including a resistor 602 and the resistor 205 connected to the +terminal of the primary smoothing capacitor 105. The structure in FIG. 5B has advantages in operation similar to the ones of the overcurrent detection circuit described above. However, in this input AC voltage compensation circuit, the power caused by the voltage at the +terminal of the primary smoothing capacitor 105 is constantly consumed due to the combined resistance of the resistor 602 and the resistor 205.

As described above, with the structure of the present embodiment shown in FIG. 5A, it is possible to compensate the input AC voltage without an increase in the power consumption.

Third Embodiment

Figure 6A:
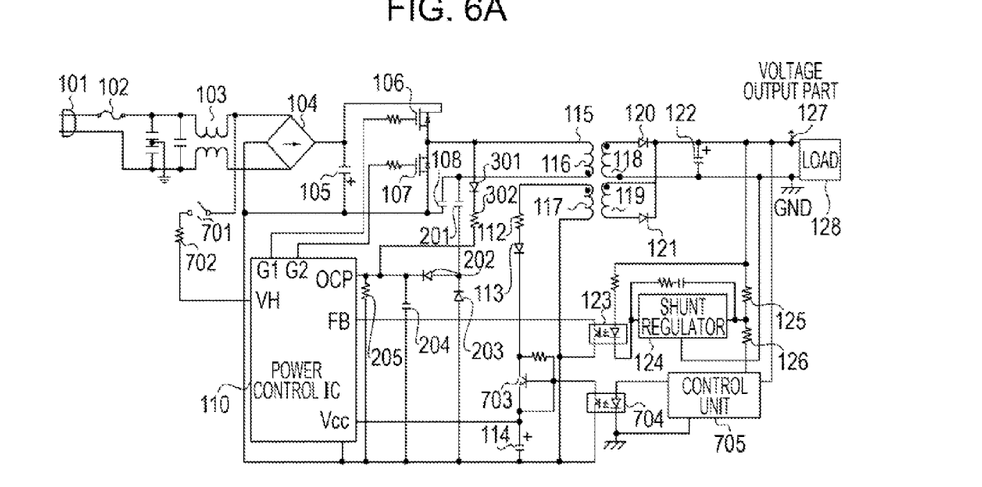
FIG. 6A is a circuit diagram of a current resonance power supply apparatus according to a third embodiment of the present invention.
Figure 6B:
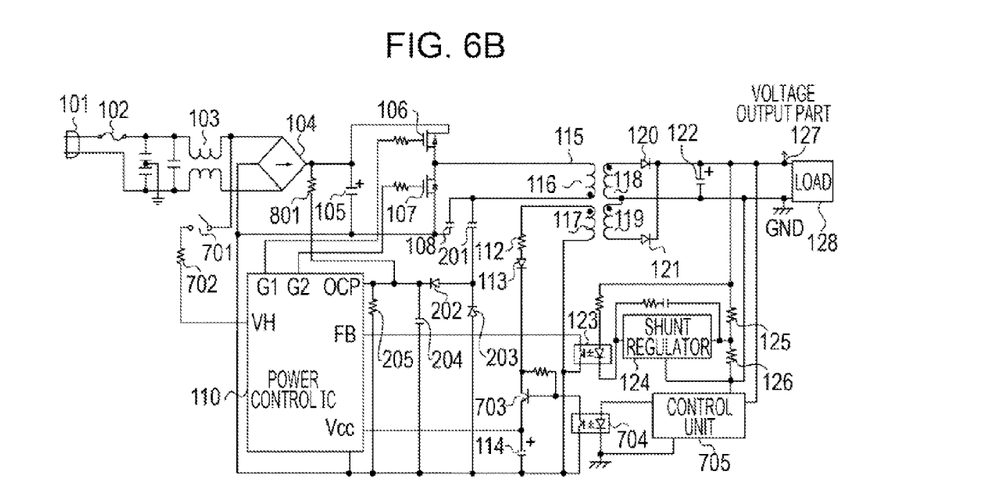
FIG. 6B is a comparative circuit diagram.

FIG. 6 includes a circuit diagram of a current resonance power supply apparatus according to a third embodiment of the present invention. In the third embodiment, the power saving is realized when a power supply switch is turned off while the function of compensating the AC voltage, described above in the first embodiment, is given to the overcurrent detection circuit.

Referring to FIG. 6A, reference numeral 701 denotes a power supply switch, reference numeral 702 denotes a starting resistor, reference numeral 703 denotes a transistor, reference numeral 704 denotes a photocoupler, and reference numeral 705 denotes a control unit. In the power supply apparatus shown in FIG. 6A, turning on of the power supply switch 701 causes a starting voltage to be supplied to a VH terminal of the power control IC 110 through the starting resistor 702 to start activation of the power supply apparatus.

When the power supply switch 701 is turned off, the control unit 705 detects that the power supply switch 701 is turned off with means for detecting the turning-on or turning-off of the power supply switch (not shown). Upon detection of the turning-off of the power supply switch 701, the control unit 705 operates the photocoupler 704 to stop the power supply apparatus. Since the control unit 705 can determine the stop of the power supply apparatus even if the power supply switch 701 is suddenly turned off in this structure, the structure has an advantage in that the power supply apparatus can be stopped after a variety of processing is performed.

The power saving is further improved if the power consumption is suppressed when the power supply switch 701 is turned off in the power supply apparatus shown in FIG. 6A. Since the FET 106 is in the off state when the power supply switch 701 is turned off in the structure in FIG. 6A, the input AC voltage compensation circuit does not consume the power, unlike the first embodiment. Furthermore, while the power supply apparatus is operating, the voltage between the drain and the source of the FET 107 can be used to perform the compensation to the overcurrent detection circuit in accordance with the input AC voltage, as described above in the first embodiment.

Structures to compensate the input AC voltage can be considered, in addition to the input AC voltage compensation circuit having the structure shown in FIG. 6A. For example, a structure shown in FIG. 6B is an exemplary structure to compensate the input AC voltage. However, the structure in FIG. 6B has a problem in that the power consumption is increased because of the above function. Specifically, in the structure in FIG. 6B, a voltage resulting from voltage division of the voltage at the +terminal of the primary smoothing capacitor 105 between a resistor 801 and the resistor 205 can be used to perform the input AC voltage compensation to the overcurrent detection circuit. However, even when the power supply switch is turned off, the power caused by the voltage at the +terminal of the primary smoothing capacitor 105 is consumed due to the resistor 801 and the resistor 205.

As described above, with the structure of the present embodiment shown in FIG. 6A, it is possible to compensate the input AC voltage while suppressing the power consumption when the power supply switch is turned off.

(Examples to which Current Resonance Power Supply is Applied)

The current resonance power supplies described above in the first to third embodiments are each applicable as, for example, a low-voltage power supply in an image forming apparatus, such as a laser beam printer, a copier, or a facsimile. The current resonance power supply is applicable as a power supply supplying power to a controller serving as a control unit in the image forming apparatus and as a power supply supplying power to a motor serving as a driving unit.

Each of the current resonance power supplies described in the above embodiments is not limitedly applied to the low-voltage power supply in the image forming apparatus but is also applicable as a low-voltage power supply in another electronic device.

As described above, according to the present invention, it is possible to correctly detect the overcurrent even if an input AC voltage is varied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2010/057065, filed Apr. 21, 2010, which is hereby incorporated by reference herein in its entirety.

What is claimed is:

1. A current resonance power supply including a transformer including a primary winding, a secondary winding and an auxiliary winding, a first switching element, and a second switching element connected in series with the first switching element, wherein one end of the primary winding of the transformer is connected between the first and the second switching elements, other end of the primary winding of the transformer is connected to the second switching element via a resonance capacitor, the first and second switching elements are alternately operated to resonate the primary winding with the resonance capacitor in order to induce an alternating current voltage at the secondary winding of the transformer, and a voltage is supplied to a control unit through the auxiliary winding, the current resonance power supply comprising:
   the control unit configured to control operations of the first and the second switching elements:
   a current detecting circuit that is connected between the other end of the primary winding and an input terminal of the control unit and that detects a current flowing through a primary side of the transformer;
   a current compensating circuit that is connected between the one end of the primary winding and the current detecting circuit and that compensates the current detected by the current detecting circuit,
   wherein the control unit detects overcurrent if a value of the current compensated by the current compensating circuit exceeds a threshold value to stop the operations of the first and second switching elements;
   a switch used to turn on or off the voltage input into the primary side of the transformer; and
   a voltage supply control unit configured to detect turning-off of the switch, and configured to turn off the supply of the voltage from the auxiliary winding to the control unit.

2. The current resonance power supply according to claim 1,
   wherein the current compensating circuit is a circuit in which a diode and a resistor are connected between the one end of the primary winding and the first and second switching elements.

3. An image forming apparatus comprising:
   an image forming part configured to form an image;
   a controller configured to control an operation of the image forming part; and
   a power supply configured to supply a voltage to the controller,
   wherein the power supply includes a transformer including a primary winding, a secondary winding and an auxiliary winding, a first switching element, and a second switching element connected in series with the first switching element, wherein one end of a primary winding of the transformer is connected between the first and the second switching elements, other end of the primary winding of the transformer is connected to the second switching element via a resonance capacitor, and the first and second switching elements are alternately operated to resonate the primary winding with the resonance capacitor in order to induce an alternating current voltage at a secondary winding of the transformer and a voltage is supplied to a control unit through the auxiliary winding, the power supply comprising:
   the control unit configured to control operations of the first and the second switching elements:
   a current detecting circuit that is connected between the other end of the primary winding and an input terminal of the control unit and that detects a current flowing through a primary side of the transformer;
   a current compensating circuit that is connected between the one end of the primary winding and the current detecting circuit and that compensates the current detected by the current detecting circuit,
   wherein the control unit detects overcurrent if a value of the current compensated by the current compensating circuit exceeds a threshold value to stop the operations of the first and second switching elements,
   a switch used to turn on or off the voltage input into the primary side of the transformer; and
   a voltage supply control unit configured to detect turning-off of the switch, and configured to turn off the supply of the voltage from the auxiliary winding to the control unit.

4. The image forming apparatus according to claim 3,
   wherein the current compensating circuit is a circuit in which a diode and a resistor are connected between the one end of the primary winding and the first and second switching elements.

* * * * *